Patented Feb. 17, 1931

1,792,532

UNITED STATES PATENT OFFICE

HENNING GUSTAV FLODIN, OF STOCKHOLM, SWEDEN

METHOD FOR CONVERTING METALS INTO SPONGE OR SPONGY MASSES

No Drawing. Application filed March 30, 1928, Serial No. 266,115, and in Sweden November 17, 1927.

The present invention relates to a method for bringing a metal or more metals in combination (for instance iron and chromium) into the form of sponge or a spongy mass direct from the oxidized metal, or metals, the reduction being effected in a known manner by means of carbon, ferro-silicon, aluminium silicide, chromium silicide or metals with a high reduction temperature, such as aluminium, etc.

The following process for producing chrome-iron sponge with a low carbon content and a fixed proportion between the iron and the chromium may be given as an example of the carrying out of the method:—

Crushed iron-ore and chrome-ore are mixed in such proportions that the desired relation between iron and chromium is obtained after the metal oxides have been reduced, and a reducing agent, such as carbon and ferro-silicon, for instance, and a binder, is introduced into the mixture, which is then moulded or pressed into briquettes or otherwise made into pieces. The briquettes or pieces are dried and in a known manner charged into an appropriate furnace, in which they are exposed to a temperature which, from about 800° C. is gradually raised to 1100° C. The briquettes or pieces are then, within the furnace or outside of it, brought into a heating zone with a temperature of 1150–1200° C. The reduction of the iron oxide contained in the briquettes has begun already in the zone next above 800°, and the briquettes remain in that zone of the furnace which lies between 800° and 1100° until the iron is completely reduced and the calculated quantity of carbon contained in the mixture has been totally consumed, and the iron has been converted into sponge. At this temperature the ferro-silicon has no action on the metal oxides, but the reaction in the said zone of heat takes place according to the following formula:

$$2Fe_3O_4 + 2Cr_2O_3 + 8C + 3Si = \underset{\text{Iron Sponge Briquettes}}{2Fe_3 + 2Cr_2O_3 + 3Si} + \underset{\text{Gas.}}{8CO}$$

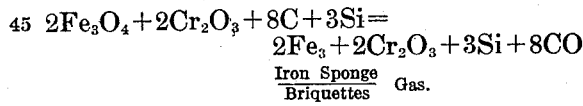

When the briquettes, which now contain practically carbon-free iron sponge, enter the hottest zone at 1150–1300° C., the chrome oxide is, in developing heat, reduced by the silicon at about 1200°.

The process can in principle be carried out in a furnace in the shape of a shaft, in which the temperature rises by sections downwards and through which the mixture of metals proceeds downwards, the necessary heat for the reduction of the iron oxide being generated by the carbonic oxide, developed by the reduction, oxidizing into carbonic acid. If necessary, external heat may be applied to attain the temperature required for the silicon to reduce the chrome oxide into chrome sponge which together with the iron sponge will form chrome-iron sponge.

The process may be carried out in such a manner that chrome-ore alone is mixed with ferro-silicon and, after the briquettes have been dried, introduced into a furnace of known construction and therein heated to the required reduction temperature of 1150–1300° C., when chrome iron sponge, after the reduction has commenced, is formed without application of external heat, since heat is developed.

The invention is not restricted to the example given, which may be varied without departing from the principle upon which the invention is based.

Having now described my invention, what I claim as new and desire to secure by Letters Patent is:—

Method for producing chrome-iron sponge which consists in mixing crushed chrome-ore and iron-ore with an addition of ferro-silicon or another silicon alloy, carbon and a suitable binder, the content of carbon in the mixture being so calculated that, on reduction, the iron oxide contained in the ore mixture is nearly completely reduced by the carbon, forming the mixture into briquettes or pieces, heating the said briquettes or pieces first to about 800° C. and thereafter gradually up to 1100° C., until the carbon has been consumed and the iron reduced without the silicon contained in the mixture having had any reaction on the iron and chrome oxides, whereupon the said briquettes or pieces are allowed to enter a zone heated to 1150°–1300° C., in which zone the silicon reduces the chromium oxide, the chromium together with the iron already reduced, forming a chrome-iron sponge of low carbon content.

In testimony whereof I have signed my name to this specification.

HENNING GUSTAV FLODIN.